July 19, 1955 E. HÜBEL 2,713,255
CIGAR LIGHTER
Filed Jan. 24, 1951
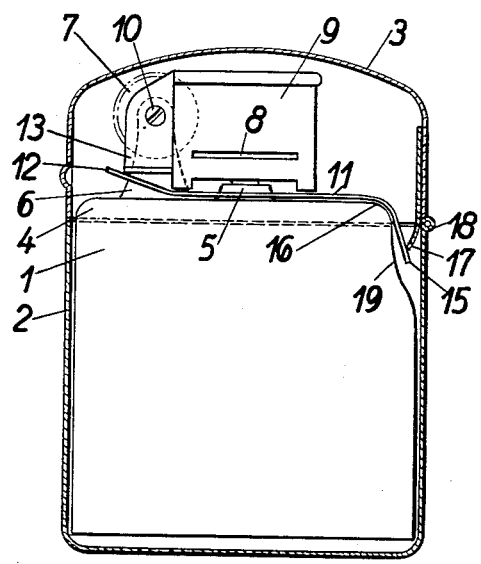
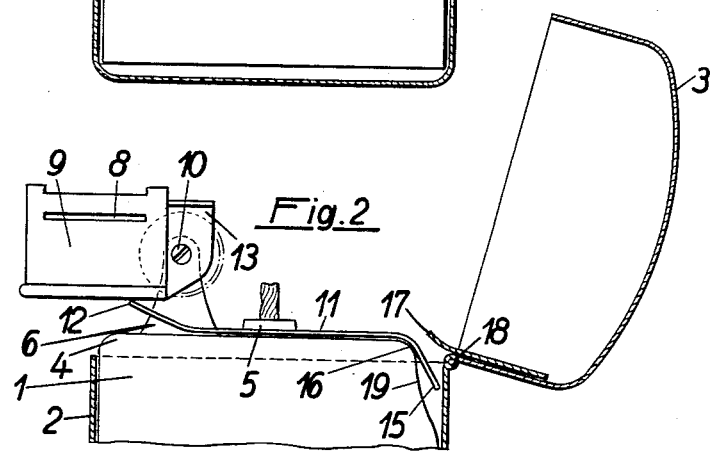
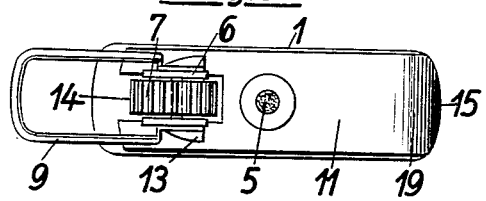
INVENTOR
EMIL HÜBEL

2,713,255

CIGAR LIGHTER

Emil Hübel, Vienna, Austria, assignor to Arthur Dubsky, Elmhurst, N. Y.

Application January 24, 1951, Serial No. 207,479

2 Claims. (Cl. 67—7.1)

Most of the known lighters are provided with a windshield jacket, which while affording a good protection for the flame, renders very difficult the cleaning of the friction wheel and of the wick, and the pulling up of the latter.

The subject of this invention is a lighter which comprises a windshield jacket which can be turned outwardly and is held by a spring at least in its flame-shielding position. In a preferred embodiment of the invention the spring acting on the windshield jacket is used at the same time also for locking the lighter cover, at least in its closed position. Owing to the capability of the windshield jacket of being turned outwardly, the wick and the friction wheel can be made accessible by one operation and cleaned easily.

On the accompanying drawings a lighter embodying this invention is shown, by way of example, in Fig. 1 in a partially sectional side elevation, in the position for non-use; in Fig. 2 in a partial vertical section, with the cover opened and the windshield jacket turned outwardly, and in Fig. 3 in a top plan view showing the fuel tank, with friction wheel, wick holder, and turned-out windshield jacket, removed out of the casing.

The fuel tank 1 is fitted in the casing 2, which can be closed by a hinged cover 3. At its top end wall 4, the tank 1 carries the wick holder 5 and the friction wheel bracket 6 with the friction wheel 7. A windshield jacket 9, consisting of a metal strip bent in the shape of a U and provided with slots 8 is swingably mounted with its limbs on the friction wheel spindle 10.

A strip spring 11 serves for securing the windshield jacket 9 in its flame-shielding position, and for securing the cover 3 in its closed position. The strip spring 11 bears on the end face 4 of the tank 1 and is suitably fixed by means of the wick holder 5. One end 12 of the spring has a bifurcated cutting-out 14. This end is slightly bent up and bears against the lower edges of the limb ends 13 of the windshield jacket. Situated on different sides in respect of the friction wheel spindle 10, the parts 13 and 9, respectively, constitute two arms of a lever. When now the limb ends 13 are pressed upwardly by the end 12 of the spring, the jacket 9 is pressed against the end wall 4 and thus held fast in its position for shielding the flame. The bifurcated shape of the cutting-out 14 is necessary because the friction wheel bracket 6 extends through this cutting-out.

The other end 15 of the spring is bent in the shape of an angle about a corner 16 of the fuel tank 1. When the cover 3 is in its closed position, the end 15 of the spring is placed under initial stress (compare Figs. 1 and 2) by the transverse edge of a lug 17 rigidly fixed to the cover. Owing to the distance of the transverse edge from the hinge 18 of the cover, a turning moment results, whereby the cover is held in its closed position. A space for the bent-down end 15 of the spring is defined by an offset side wall portion 19 of the tank 1 and by the adjacent portion of the casing 2.

The lighter can be operated without difficulty by one hand, the thumb lifting the cover 3 for moving the lug 17 out of the range of the spring end 15 and turning back the cover. Subsequently the same thumb turns the friction wheel.

When the flame is to be made freely accessible, or for cleaning the wick and the friction wheel, the windshield jacket is turned outwardly (Fig. 2). From the drawings it is apparent that if the windshield jacket is to be turned outwardly to the largest possible extent, the radial distance from the friction wheel spindle 10 to the top end face 4 of the tank must exceed the radial length of the shorter arm 13 of the windshield jacket.

This invention can also be embodied in lighters having other types of covers and modes of operating the cover, e. g., a windshield jacket which can be turned outwardly and is held in its flame-shielding position by a strip spring 11 can be incorporated also in lighters having a spring-loaded cover, a tilting cover, or a cover which is removably mounted on the lighter as a separate part.

What I claim is:

1. In a lighter, the combination of a first two-armed lever, one arm of which constitutes a cover, a second two-armed lever, one arm of which constitutes a windshield jacket, separate pivot means connecting said two levers, respectively, to the top of the lighter, a wick connected to the top of the lighter between said two pivot means, said windshield jacket being movable into an operative position in which it surrounds said wick, said lighter being formed at its top with a recess between said wick and the pivot means for said first lever, the second arm of said first lever extending into said recess in the closed position of the cover, and a leaf spring having a central portion rigidly fixed to the top of the lighter, said spring further having two resilient end portions, one of which is bent upwardly from the top of the lighter to resiliently engage the second arm of said second lever in the operative position of the windshield jacket, whereas the other resilient end portion of said spring is bent downwardly into said recess to resiliently engage under initial stress said second arm of said first lever in the closed position of the cover and being disengaged from the cover arm of said first lever in said closed position thereof, said second arms of said levers and said end portions of the spring being arranged for an engagement of the end portions by said arms on the side of the spring facing off the top of the lighter.

2. In a lighter, the combination of a first two-armed lever, one arm of which constitutes a cover, a second two-armed lever, one arm of which constitutes a windshield jacket, separate pivot means connecting said two levers, respectively, to the top of the lighter, a wick holder connected to the top of the lighter between said two pivot means, said windshield jacket being movable into an operative position in which it surrounds the wick holder, said lighter being formed at its top with a recess between said wick holder and the pivot means for said first lever, the second arm of said first lever extending into said recess in the closed position of the cover, and a leaf spring having a central portion rigidly fixed to the top of the lighter by said wick holder, said spring further having two resilient end portions, one of which is bent upwardly from the top of the lighter to resiliently engage the second arm of said second lever in the operative position of the windshield jacket, whereas the other resilient end portion of said spring is bent downwardly into said recess to resiliently engage under initial stress said second arm of said first lever in the closed position of the cover and being disengaged from the cover arm of said first lever in the closed position thereof, said second arms of said levers and said end portions of the spring being arranged for an engagement of the end portions by said arms on the side of the spring facing off the top of the lighter.

References Cited in the file of this patent

UNITED STATES PATENTS

| | | |
|---|---|---|
| 351,787 | Miller | Nov. 2, 1886 |
| 970,517 | Lockhart | Sept. 20, 1910 |
| 2,521,181 | Morse | Sept. 5, 1950 |

FOREIGN PATENTS

| | | |
|---|---|---|
| 38,121 | France | Jan. 7, 1921 |
| 138,423 | Austria | July 25, 1934 |
| 589,186 | Great Britain | June 13, 1947 |
| 626,624 | France | May 16, 1927 |
| 830,622 | France | May 16, 1938 |